(12) United States Patent
Yoshikawa et al.

(10) Patent No.: US 10,670,092 B2
(45) Date of Patent: Jun. 2, 2020

(54) DISC BRAKE DEVICE (71) Applicant: AKEBONO BRAKE INDUSTRY CO., LTD., Tokyo (JP)

(72) Inventors: Kazuhiro Yoshikawa, Tokyo (JP); Kohei Noma, Tokyo (JP)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 35 days.

(21) Appl. No.: 15/741,775

(22) PCT Filed: Jun. 28, 2016

(86) PCT No.: PCT/JP2016/069088
§ 371 (c)(1),
(2) Date: Jan. 4, 2018

(87) PCT Pub. No.: WO2017/006803
PCT Pub. Date: Jan. 12, 2017

(65) Prior Publication Data
US 2018/0195564 A1    Jul. 12, 2018

(30) Foreign Application Priority Data

Feb. 9, 2016 (JP) ................................ 2016-022346

(51) Int. Cl.
*F16D 55/227* (2006.01)
*F16D 65/18* (2006.01)
(Continued)

(52) U.S. Cl.
CPC ............ *F16D 55/227* (2013.01); *B60T 13/74* (2013.01); *F16D 55/226* (2013.01);
(Continued)

(58) Field of Classification Search
CPC .. F16D 55/227; F16D 65/18; F16D 2200/003; F16D 2200/0013; F16D 2200/0021
See application file for complete search history.

(56) References Cited

U.S. PATENT DOCUMENTS 3,245,500 A * 4/1966 Hambling ............. F16D 55/226
188/152
3,428,152 A   2/1969 Hoenick
(Continued)

FOREIGN PATENT DOCUMENTS

CN    A-1048086    12/1990
CN    A-1063535    8/1992
(Continued)

OTHER PUBLICATIONS

Extended European Search Report dated Feb. 26, 2019 in corresponding European patent application 16821272.8 (5 pages).
(Continued)

*Primary Examiner* — Xuan Lan Nguyen
(74) *Attorney, Agent, or Firm* — Faegre Drinker Biddle & Reath LLP (57) ABSTRACT

A floating type disc brake device in which a body, a support and a cylinder unit are configured separately, and a first piston and a second piston are accommodated in the cylinder unit, wherein the cylinder unit is fixed to arm portions provided on both the rotation-in side and the rotation-out side of a rotor in the support via cylinder attachment portions disposed on the outer circumference side of the cylinder unit.

9 Claims, 9 Drawing Sheets

(51) Int. Cl.
  *B60T 13/74* (2006.01)
  *F16D 55/226* (2006.01)
  *F16D 65/00* (2006.01)
  *F16D 55/00* (2006.01)
  *B60T 13/58* (2006.01)
  *F16D 121/04* (2012.01)
  *F16D 125/04* (2012.01)
  *F16D 125/10* (2012.01)

(52) U.S. Cl.
  CPC ..... *F16D 65/0087* (2013.01); *F16D 65/0093* (2013.01); *F16D 65/18* (2013.01); *F16D 65/183* (2013.01); *B60T 13/588* (2013.01); *F16D 2055/0008* (2013.01); *F16D 2121/04* (2013.01); *F16D 2125/04* (2013.01); *F16D 2125/10* (2013.01); *F16D 2200/003* (2013.01); *F16D 2200/0013* (2013.01); *F16D 2200/0021* (2013.01)

(56) References Cited

U.S. PATENT DOCUMENTS

| | | | |
|---|---|---|---|
| 3,480,116 A | 11/1969 | Rath | |
| 3,651,898 A | 3/1972 | Habgood | |
| 3,656,589 A * | 4/1972 | Kawabe | F16D 55/226 188/72.5 |
| 3,773,149 A * | 11/1973 | Toshida | F16D 55/226 188/72.4 |
| 3,844,384 A * | 10/1974 | Toshida | F16D 55/226 188/72.5 |
| 3,897,858 A * | 8/1975 | Toshida | F16D 55/226 188/72.5 |
| 3,952,840 A * | 4/1976 | Yamazaki | F16D 55/22 188/71.8 |
| 3,958,667 A | 5/1976 | deGennes | |
| 4,085,829 A * | 4/1978 | Shimizu | F16D 55/226 188/72.5 |
| 4,122,920 A * | 10/1978 | Harvey | F16D 55/227 188/73.45 |
| 4,189,032 A * | 2/1980 | Farr | F16D 55/224 188/73.44 |
| 4,313,526 A * | 2/1982 | Farr | F16D 55/22655 188/72.4 |
| 5,090,520 A | 2/1992 | Gockel et al. | |
| 6,695,099 B1 * | 2/2004 | Waag | F16D 55/228 188/70 R |
| 6,708,802 B2 * | 3/2004 | Stahl | F16D 55/227 188/71.1 |
| 8,485,323 B2 * | 7/2013 | Narayanan, V | F16D 55/227 188/250 B |
| 2014/0158483 A1 * | 6/2014 | Miyahara | F16D 55/228 188/73.47 |
| 2015/0260244 A1 * | 9/2015 | Maehara | F16D 65/0087 188/72.4 |

FOREIGN PATENT DOCUMENTS

| | | |
|---|---|---|
| EP | A1-0495311 | 7/1992 |
| GB | 1297437 | 11/1972 |
| GB | A-1297437 | 11/1972 |
| GB | A-1428026 | 3/1976 |
| GB | A-2439332 | 12/2007 |
| JP | H05-24369 B2 | 4/1993 |
| JP | H08-254234 A | 10/1996 |
| JP | 2006-231954 A | 9/2006 |
| JP | 2007-321975 A | 12/2007 |
| JP | 2009-58035 A | 3/2009 |
| JP | 2014-101998 A | 6/2014 |

OTHER PUBLICATIONS

CN Office Action dated Dec. 12, 2018 in Chinese Application No. 201680040608.4 (with attached English-language translation).
International Search Report dated Sep. 6, 2016 for PCT/JP2016/069088, including English translation.
International Search Report/Written Opinion dated Sep. 6, 2016 for PCT/JP2016/069088 [non-English language].
Chinese Office Action dated Aug. 16, 2019 that issued in CN Patent application No. 201680040608.4, along with its English-language translation attached.

* cited by examiner

DISC BRAKE DEVICE

TECHNICAL FIELD

The present invention relates to a disc brake device.

BACKGROUND ART

Patent Document 1 and Patent Document 2 show examples of a floating type disc brake device having two pistons of a first piston and a second piston in a cylinder.

Each of the disc brake devices disclosed in Patent Documents 1 and 2 above adopts a configuration in which the cylinder having the first piston and the second piston and a support fixing the disc brake device to a vehicle are integrally formed. Both the inner side and the outer side of a brake pad adopt a configuration supported by a slide pin for sliding the body.

PRIOR ART DOCUMENT

Patent Document

Patent Document 1: JP-B-5-24369
Patent Document 2: JP-A-8-254234

SUMMARY OF THE INVENTION

Problems to be Solved by the Invention

Each of the disc brake devices disclosed in Patent Documents 1 and 2 above receives a braking torque from the brake pad only by the slide pin. Therefore, when braking from high speed running, it is concerned that the strength of the slide pin is insufficient. Also, since the brake pad is supported in a state hung on the slide pin, uneven wear is also concerned.

Therefore, an object of the present invention is to provide a disc brake device capable of reducing the load on the slide pin and eliminating the concern about insufficient strength at the time of braking.

Means for Solving the Problem

The object of the present invention is achieved by the following configuration.

(1) A floating type disc brake device in which a body, a support and a cylinder unit are configured separately and a first piston and a second piston are accommodated in the cylinder unit, wherein the cylinder unit is fixed to arm portions provided on both of the rotation-in side and the rotation-out side of a rotor in the support via cylinder attachment portions disposed on the outer circumference side of the cylinder unit.

(2) The disc brake device having the configuration as described in (1) above, wherein a fixed position for fixing the cylinder unit in the arm portion is positioned on an outer circumference side in the radial direction of the rotor with respect to a torque receiving portion in the arm portion.

Since the disc brake device has the configuration as described in (1) or (2) above, the cylinder unit plays a role as a strength member of the support, and when braking torque is applied to the arm portion, the arm unit can be prevented from extending toward the rotation-out side. For this reason, even in a case where the support is managed to be thin and light, the disc brake device can obtain necessary and sufficient strength.

(3) The disc brake device having the configuration as described in (1) or (2) above, wherein a fixed position for fixing the cylinder unit in the arm portion is positioned on an outer circumference side in the radial direction with respect to the outer circumference of the rotor.

In a case that the disc brake device has the configuration as described in (3) above, the cylinder unit plays a role as a strength member of the support, and when braking torque is applied to the arm portion, the arm unit can be prevented from extending toward the rotation-out side. Also, since the distance from the torque receiving portion to the fixed portion in the arm portion is separated, it is possible to obtain a large durability with small reinforcement based on the principle of a lever. For this reason, even in a case where the support is managed to be thin and light, the disc brake device can obtain necessary and sufficient strength.

(4) The disc brake device having the configuration as described in any one of (1) to (3) above, wherein the cylinder attachment portion is fixed to the fixed position for fixing the cylinder unit via a slide pin holding the body.

Since the disc brake device has the configuration as described in (4) above, the assemblability of the disc brake device can be improved.

(5) The disc brake device having the configuration as described in any one of (1) to (4) above, wherein the disposing position of the cylinder unit is positioned on an inner circumference side in the radial direction with respect to the fixed position for fixing the cylinder unit, and a space is provided between the two fixed positions positioned on the rotation-in side and the rotation-out side of the rotor, and main bridges connecting the inner side and the outer side of the body are provided in the body at the rotation-in side and the rotation-out of the rotor respectively in the space provided between the fixed positions.

Since the disc brake device has the configuration as described in (5) above, the main bridges configuring the body can pass through the configured space. Accordingly, it is possible to prevent the rigidity from lowering while reducing the overall size of the disc brake device.

(6) The disc brake device having the configuration as described in (5) above, wherein a connecting portion for connecting two main bridges is provided in a center part of the body back portion in an axial direction of the rotor and between the main bridge disposed on the rotation-in side and the main bridge disposed on the rotation-out side.

Since the disc brake device has the configuration as described in (6) above, it is possible to improve the rigidity of the body. In particular, it is possible to improve the strength of the body against a load in an oblique direction with the connecting portion as a base point.

(7) The disc brake device having the configuration as described in (6) above, wherein a center bridge extending from the connecting portion to the inner side of the body is provided.

Since the disc brake device has the configuration as described in (7) above, it is possible to further improve the rigidity of the body. Also, it is possible to keep good fluidity when the body is casted.

(8) The disc brake device having the configuration as described in any one of (1) to (7) above, wherein the support and the cylinder unit are made of different materials.

Since the disc brake device has the configuration as described in (8) above, the disc brake device can balance among weight reduction and strength securing, improvement of processability, and cost.

(9) The disc brake device having the configuration as described in any one of (1) to (8) above, wherein the first piston and the second piston are configured to generate pressing force by power other than hydraulic pressure.

Since the disc brake device has the configuration as described in (9) above, it is possible to apply the disc brake device even in an environment in which a hydraulic pressure unit cannot be used and to improve the versatility.

Effect of the Invention

According to the disc brake device having the configuration as described above, it is possible to reduce the load on the slide pin and to eliminate the concern about insufficient strength at the time of braking.

DESCRIPTION OF EMBODIMENTS

Figure 1:
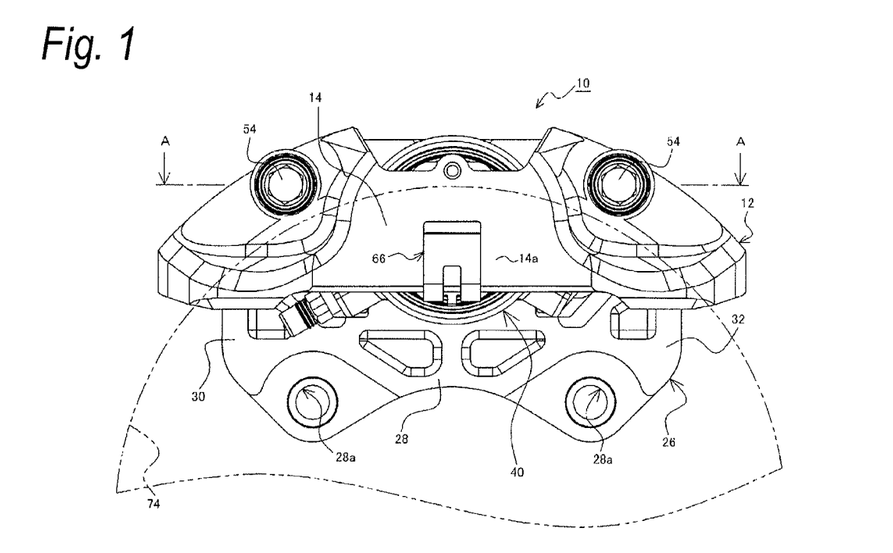
FIG. 1 is a front view showing a configuration of a disc brake device according to an embodiment of the present invention.
Figure 2:
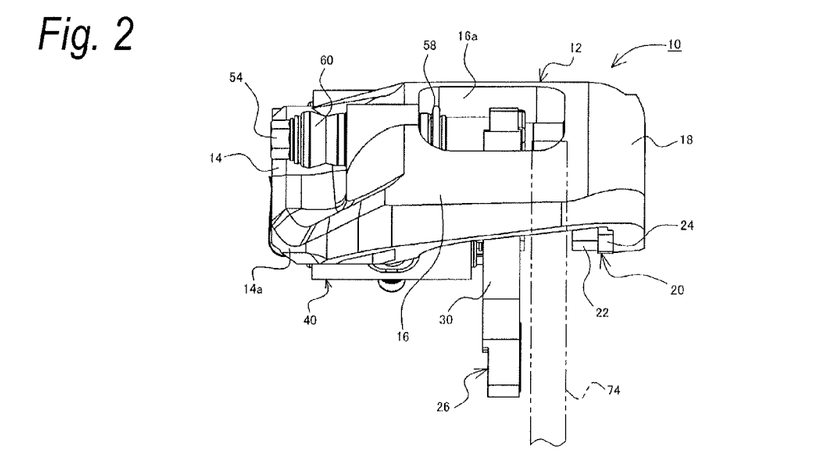
FIG. 2 is a left side view showing the configuration of the disc brake device according to the present embodiment.
Figure 3:
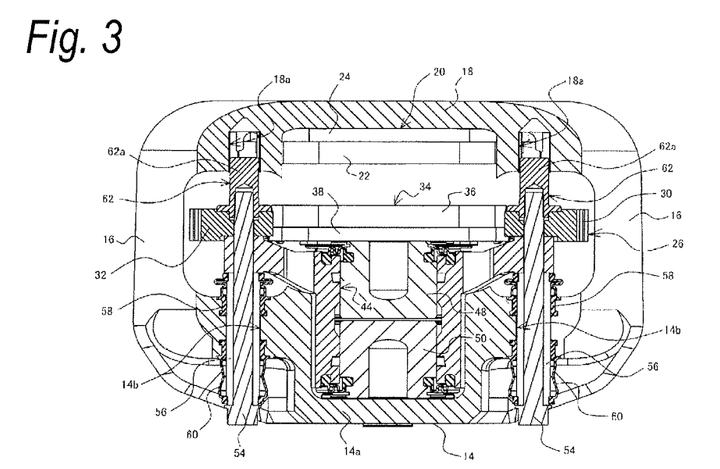
FIG. 3 is a view showing an A-A cross section in FIG. 1.
Figure 4:
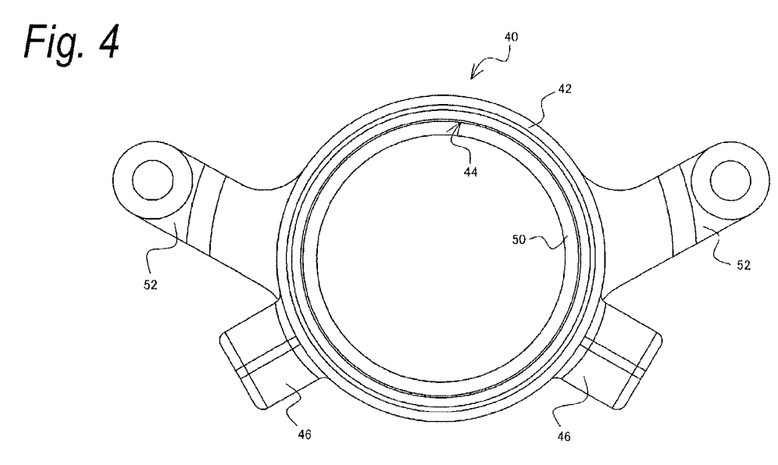
FIG. 4 is a front view showing a configuration of a cylinder unit configuring the disc brake device according to the present embodiment.
Figure 5:
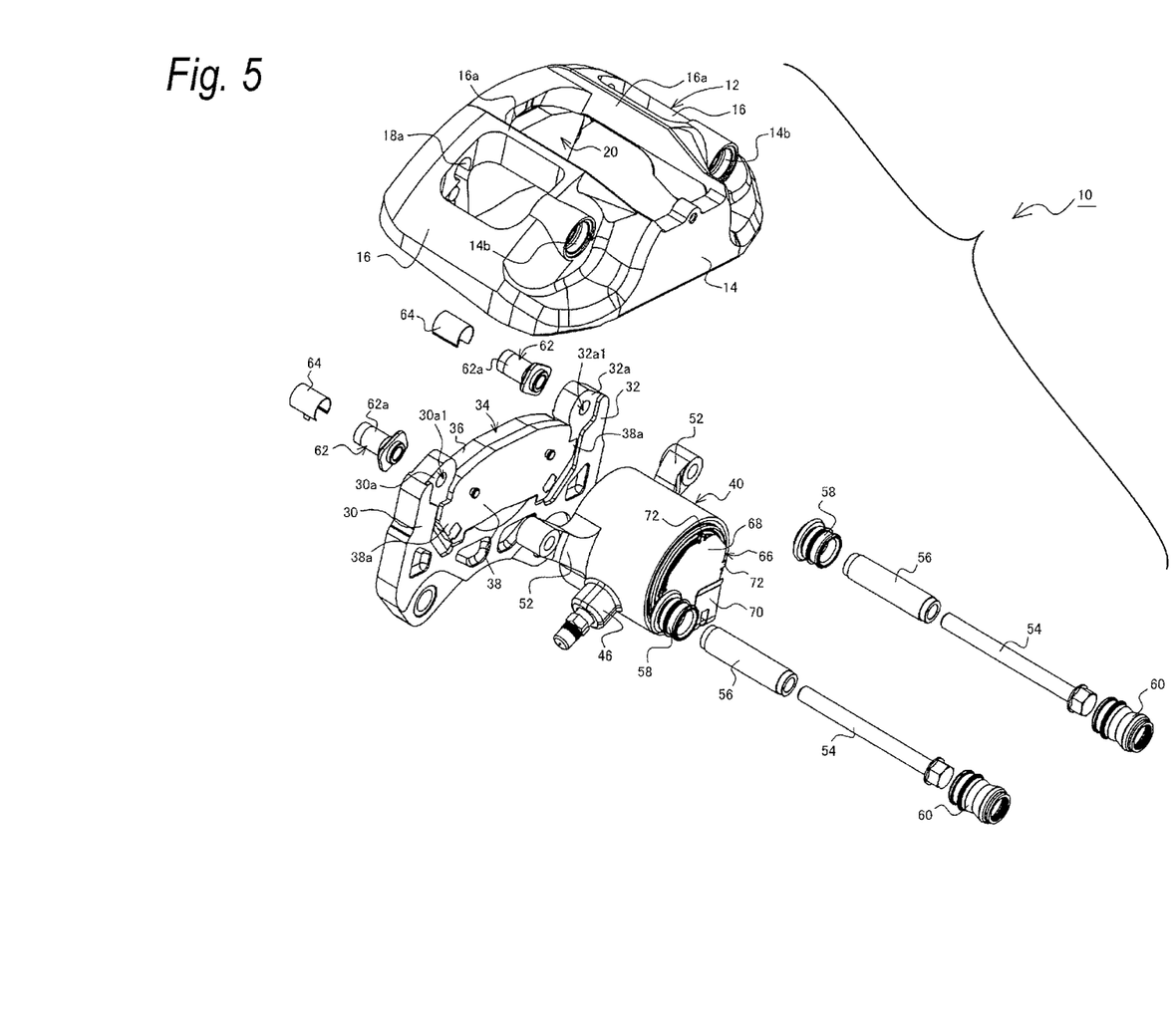
FIG. 5 is a partially exploded perspective view of the disc brake device according to the present embodiment.
Figure 6:
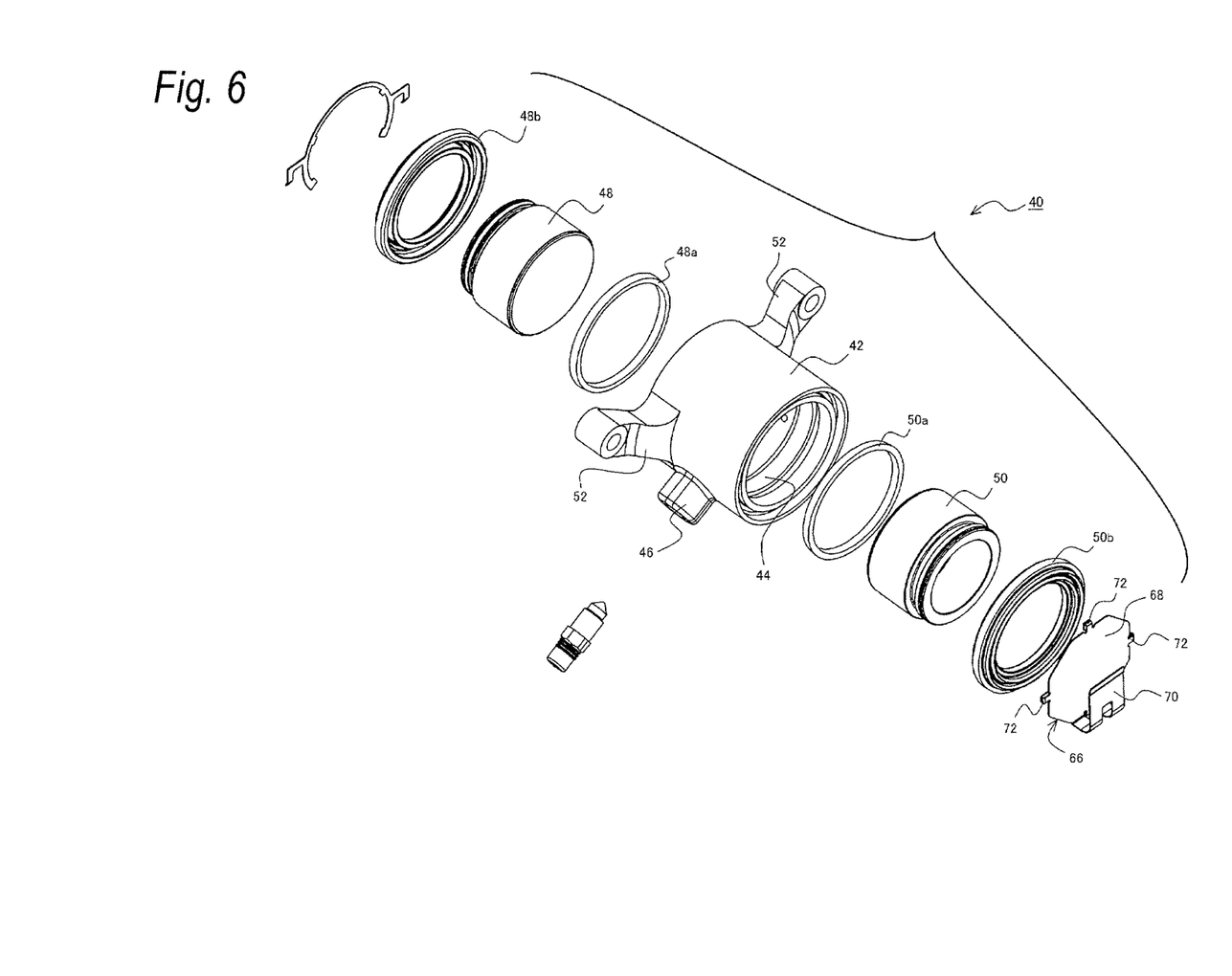
FIG. 6 is an exploded perspective view of the cylinder unit according to the present embodiment.

Hereinafter, embodiments of the disc brake device of the present invention will be described in detail with reference to the drawings. In the drawings, FIG. 1 is a front view showing a configuration of a disc brake device according to an embodiment of the present invention, and FIG. 2 is a left side view. FIG. 3 is a view showing an A-A cross section in FIG. 1. FIG. 4 is a front view showing a configuration of a cylinder unit of the disc brake device according to the present embodiment. FIG. 5 is a partially exploded perspective view of the disc brake device according to the present embodiment, and FIG. 6 is an exploded perspective view of the cylinder unit according to the present embodiment.

A disc brake device 10 according to the present embodiment is based on a body 12, a support 26 and a cylinder unit 40, and each of them is configured separately.

The body 12 is a floating member that plays a role of covering the support 26 and the cylinder unit 40, which will be described in detail, and pressing an outer side brake pad 20 (hereinafter simply referred to as outer pad 20) on a sliding surface of a rotor 74 by sliding to the axis line direction of the rotor 74.

As a specific configuration, the disc brake device 10 includes an inner side body 14, an outer side body 18 and bridges (a side bridge 16 and a main bridge 16a). The inner side body 14 is a part positioned on the side where the support 26 and the cylinder unit 40 are disposed with the rotor 74 as a base when the body 12 is assembled. A guide hole 14b (refer to FIG. 3) is provided on the inner side body 14 in addition to a pressure receiving portion 14a. The pressure receiving portion 14a is a part which is pressed from the inside by the second piston 50 disposed in the cylinder unit 40 which will be described in detail. Also, the guide hole 14b is a through hole for inserting a slide pin 54 for holding the body 12 with respect to the support 26 which will be described in detail.

The outer side body 18 is a part positioned on the opposite side of a disposition side of the support 26 with the rotor 74 as a base when the body 12 is assembled. In the disc brake device 10 according to the present embodiment, the outer pad 20 is disposed on a surface facing the rotor 74 in the outer body 18.

The outer pad 20 is configured based on a lining 22 which is a friction member and a pressure plate 24 which is a steel plate with on which the lining 22 is stuck, and the pressure plate 24 is fastened to the outer side body 18. A pin receiving portion 18a supporting the tip of the slide pin 54 is provided on the side of the outer side body 18 facing the rotor 74.

The bridge is a portion for connecting the inner side body 14 to the outer side body 18 described above and is disposed so as to connect the two at the outer circumference side of the rotor 74. In the body 12 according to the present embodiment, the bridge disposed on the center side of the body 12 is called a main bridge 16a, and the bridge disposed on the outside of the body 12 is called a side bridge 16, so both the rigidity and weight reduction of the body 12 are compatible. By providing the bridges (the side bridge 16 and the main bridge 16a), the pressing force received by the inner side body 14 is transmitted to the outer side body 18, and the outer pad 20 can be pressed to the sliding surface of the rotor 74.

The support 26 plays a role of assembling the disc brake device 10 to a vehicle body (not shown). The support 26 according to the present embodiment is configured based on a bridge 28 and arm portions 30, 32. The bridge 28 is a base member disposed toward the rotation-in side and the rotation-out side of the rotor 74 and is provided with a fastening hole 28a for fixing the support 26 to the vehicle.

The arm portions 30, 32 are a pair of torque receivers extending in the radial direction of the rotor 74 with both end portions of the rotation-in side and the rotation-out side of the rotor 74 in the bridge 28 as base points. In the case of the arm portions 30, 32 according to the present embodiment, fixed positions 30a, 32a (see FIG. 5) for fixing the cylinder unit 40, which will be described in detail, are provided at the tip of each arm portion. Through holes 30a1, 32a1 are formed for inserting the slide pins 54 used in the fixing positions 30a, 32a when the cylinder unit 40 is fixed.

An inner side brake pad (hereinafter simply referred to as an inner pad 34) is disposed between the pair of arm portions 30, 32. Similarly to the outer pad 20, the inner pad 34 is basically made of a lining 36 which is a friction member and a pressure plate 38 which is a steel plate. An abutment portion to the arm portion 32 is an ear portion 38a provided on the pressure plate 38, and a pad clip for improving the slidability to the axial direction of the rotor 74 is provided between the ear portion 38a and the arm portions 30, 32. The inner pad 34 disposed on the support 26 is pressed to the sliding surface of the rotor 74 by being pressed to a first piston 48 provided in the cylinder unit 40.

In the support 26 according to the present embodiment, in the arm portions 30, 32, fixed positions (parts where cylinder attachment portions 52 are fixed) 30a, 32a for fixing the cylinder unit 40 are positioned on the outer circumferential side in the radial direction of the rotor 74 with respect to the torque receiving position (a position where the ear portion 38a abuts) receiving the torque of the inner pad 34.

As shown in FIGS. 4 and 6 in detail, the cylinder unit 40 has a cylinder block 42 and cylinder attachment portions 52. The cylinder block 42 has a penetratingly formed inner cylinder (a cylinder 44) and a bleeder hole/inlet hole 46 for supplying/discharging hydraulic oil from the outside of the cylinder block 42 to the cylinder 44. The cylinder unit 40 is provided with a first piston 48 and a second piston 50.

The first piston 48 is a piston for pressing the inner pad 34 and protrudes toward the disposition direction of the rotor 74. The second piston 50 is a piston protruding toward the opposite side of the first piston 48 and pressing the inner wall of the inner side body 14 of the body 12. Therefore, when the hydraulic oil is supplied into the cylinder 44, the first piston 48 and the second piston 50 are pushed out to a relatively separate direction. Seals 48a, 50a and boots 48b, 50b are provided between the cylinder 44 and the first piston 48 and between the cylinder 44 and the second piston 50, respectively.

The cylinder attachment portions 52 are support portions extending from the outer circumference of the cylinder block 42 to both directions of the rotation-in side and the rotation-out side of the rotor 74 in an assembled state, and by fixing the cylinder attachment portions 52 to the support 26, the positioning of the cylinder block 42 is performed.

In the present embodiment, as shown in FIG. 4, the cylinder attachment portions 52 are extended in a substantially V-shape from the cylinder block 42.

As described above, in the disc brake device 10 according to the present embodiment, the fixed positions 30a, 32a in the arm portions 30, 32 of the support arm 26 are provided at a position that is on the outer circumference side in the radial direction of the rotor 74 with respect to the torque receiving positions of the arm portions 30, 32 (the positions where the ear portion 38a of the inner pad 34 abuts). Therefore, the cylinder attachment portions 52 of the cylinder unit 40 are fixed to the fixed positions 30a, 32a, so that the cylinder unit 40 plays a role as a strength member. Therefore, when torque is applied to the arm portions 30, 32, the arm portions 30, 32 can be suppressed from spreading toward the rotation-out side of the rotor 74.

Therefore, even in a case where the support 26 is configured by a light and thin member, the disc brake device 10 can provide the strength necessary for braking.

Further, in the disc brake device 10 according to the present embodiment, the fixed positions 30a and 32a are disposed on the outer circumference side with respect to the outer circumference of the rotor 74. A space is formed between two fixed positions 30a, 32a by disposing the cylinder attachment portions 52 in a V shape and fastening the tips thereof to the fixed positions 30a, 32a. Therefore, it is possible to maintain the rigidity while managing to reduce the size of the entire disc brake device 10 by disposing the main bridge 16a constituting the body 12 in the space formed between the fixed positions 30a, 32a.

The body 12, the support 26, and the cylinder unit 40 having such a configuration are assembled via the slide pins 54. A sleeve 56 is disposed between the body 12 and the slide pin 54, and a form held by boots 58, 60 disposed at the front and rear of the sleeve 56 is adopted. Therefore, there is a little concern that the torque input to the body 12 via the outer pad 20 places a load on the slide pin 54. The cylinder unit 40 is assembled to the support 26 by screwing a cap nut 62 formed in a pin shape to a slide pin 54 into which the sleeve 56, the cylinder attachment portion 52 and the support 26 are inserted, while positioning is performed by the sleeve 56.

The pin 62a configured as the shape of the cap nut 62 is slidably engaged with the pin receiving portion 18a formed on the outer side body 18. As a result, when torque is input to the body 12 via the outer pad 20, the torque is transmitted to the support 26 via the cap nut 62. A clip 64 is disposed between the cap nut 62 and the pin receiving portion 18a in order to prevent an improvement in slidability and abrasion upon abutment.

In the disc brake device 10 according to the present embodiment, a shim 66 is interposed on the abutment surface between the body 12 and the second piston 50. The shim 66 has a shim plate body 68, a clamping portion 70 and a claw 72.

The shim plate body 68 plays an original role of the shim, and even when the configuration members of the body 12 and the second piston 50 have a difference in hardness, the surface pressure between the body 12 and the second piston 50 can be improved. The clamping portion 70 is a part extending in a hook shape from the shim plate body 68 toward the side of body 12, and the shim 66 can be fixed by inserting the inner side body 14 between the shim plate body 68 and the clamping portion 70. The claws 72 are protrusions extending from the shim plate body 68 toward a plurality of sides of the second piston 50. It is configured that the outer circumference of the second piston 50 is clamped by a plurality of claws 72.

With such a configuration, the body 12 can follow the movement of the second piston 50. Therefore, when the brake is opened, the body 12 and the second piston 50 return simultaneously, so that it is possible to suppress drag of the outer pad 20 fastened to the outer side body 18.

In the disc brake device 10 having such a configuration, since the support 26 and the cylinder unit 40 are formed separately, the inner pad 34 can be held by the support 26. As a result, in the floating type disc brake device 10, the torque of the inner pad 34 is not received by the slide pins 54.

Further, since the support 26 and the cylinder unit 40 are formed separately, it is possible to make configuration materials thereof different from each other, and it is possible to balance the weight reduction, rigidity, ease of processing, and cost. For example, it is possible to adopt such a structure in which the support 26 is configured by aluminum and the cylinder unit 40 is configured by iron.

In the disc brake device 10 according to the present embodiment, the fixed positions 30a, 32a of the cylinder unit 40 are provided on the outer circumference side in the radial direction of the rotor 74 with respect to the torque receiving position of the support 26, and the cylinder unit 40 is fixed by utilizing the fixed positions 30a, 32a. Therefore, the cylinder unit 40 functions as a strength member of the support 26, and when the braking torque is received, it is possible to prevent the arm portions 30, 32 of the support 26 from spreading to the rotation-out side of the rotor 74.

Further, the torque of the outer pad 20 is transmitted to the support 26 via the cap nut 62 having a short pin length via the body 12. Therefore, even on the outer pad 20 side, there is no necessity to worry about insufficient strength of the pin 62a (cap nut 62) receiving the torque.

Therefore, according to the disc brake device of the present embodiment, it is possible to reduce the load on the slide pins and to eliminate the concern about insufficient strength at the time of braking.

Further, in the above embodiment, it is stated that the plurality of claws 72 configuring the shim 66 clamp the outer circumference side of the second piston 50. However, the plurality of claws 72 may be configured to be fixed to the second piston 50 by pushing the inner circumference side of the second piston 50 mutually, so that the body 12 and the second piston 50 are coupled to each other.

In the above embodiment, the cylinder attachment portions 52 extending from the cylinder block 42 are described to be formed in a V shape with the cylinder block 42 as a base point. However, the form of the cylinder attachment portion 52 is not limited to this. That is, as long as the cylinder attachment portions 52 can be fixed to the fixed positions 30a, 32a existing on the radial outer circumference side of the rotor 74 with respect to the torque receiving position of the arm portions 30, 32, forms as shown in FIGS. 7 to 9 may be used.

Figure 7:
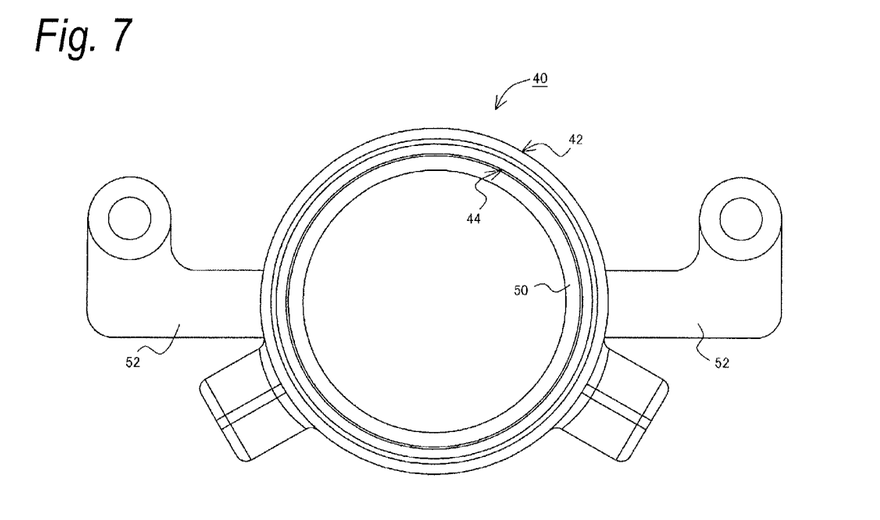
FIG. 7 is a view showing a first modification of cylinder attachment portions in the cylinder unit according to the present embodiment.

Specifically, in a case of the first modification of the cylinder attachment portions 52 in the cylinder unit 40 shown in FIG. 7, the cylinder attachment portions 52 are formed on the outer circumference of the cylinder block 42 and extend perpendicular to a direction of the outer circumference side in the radial direction of the rotor 74 after extending in the horizontal direction from the intersection point with a horizontal line passing through the center of the cylinder 44. Even in a case where the cylinder attachment portions 52 are formed in such a form, when the cylinder unit 40 is fixed to the support 26, the cylinder attachment portions 52 (the entire cylinder unit 40) work as strength members of the support 26, and the same effect as the above embodiment can be obtained.

Figure 8:
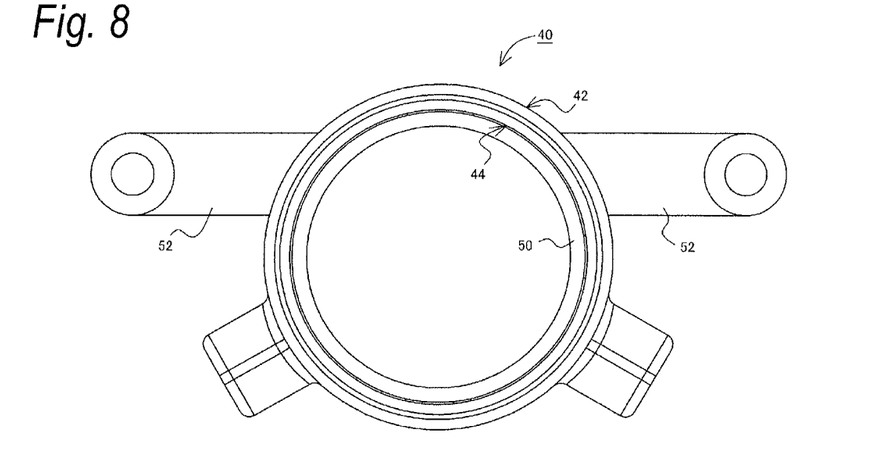
FIG. 8 is a view showing a second modification of the cylinder attachment portions in the cylinder unit according to the present embodiment.

In a second modification of the cylinder attachment portions 52 in the cylinder unit 40 shown in FIG. 8, the cylinder attachment portions 52 extend horizontally from the upper half portion of the cylinder block 42. In such a form, when the cylinder unit 40 is assembled to the support 26, the cylinder attachment portions 52 and the cylinder block 42 are configured such that the fixed positions 30a, 32a of the arm portions 30, 32 are connected by a straight line. Therefore, the effect as a strength member can be enhanced.

Figure 9:
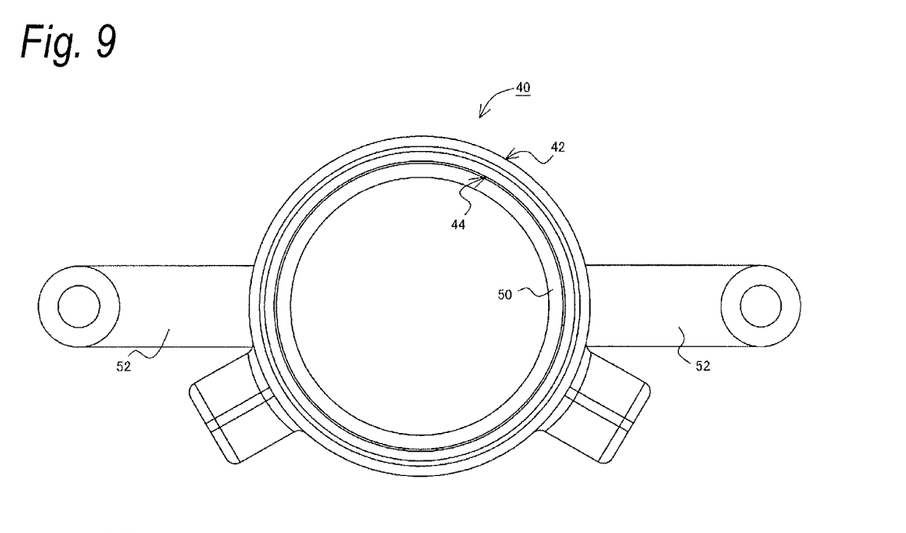
FIG. 9 is a view showing a third modification of the cylinder attachment portions in the cylinder unit according to the present embodiment.

In a third modification of the cylinder attachment portions 52 in the cylinder unit 40 shown in FIG. 9, the intersection point of the horizontal line passing through the center of the cylinder 44 and the outer circumference line of the cylinder block 42 is set as a base point, and the cylinder attachment portions 52 are extended in a horizontal direction. Even in such a configuration, the cylinder attachment portions 52 are fixed to the fixed positions 30a, 32a existing on the outer circumference side in the radial direction of the rotor 74 with respect to the torque receiving positions of the arm portions 30, 32, and if the cylinder unit 40 can exert the function, the same effect as the above embodiment can be obtained.

Further, in the above embodiment, one large opening portion is formed between the two main bridges 16a connecting the inner side body 14 and the outer side body 18 with regard to the body 12. In such a configuration, in addition to the improvement of the heat dissipation, the weight of the body 12 can be reduced.

[X Type]

Figure 10:
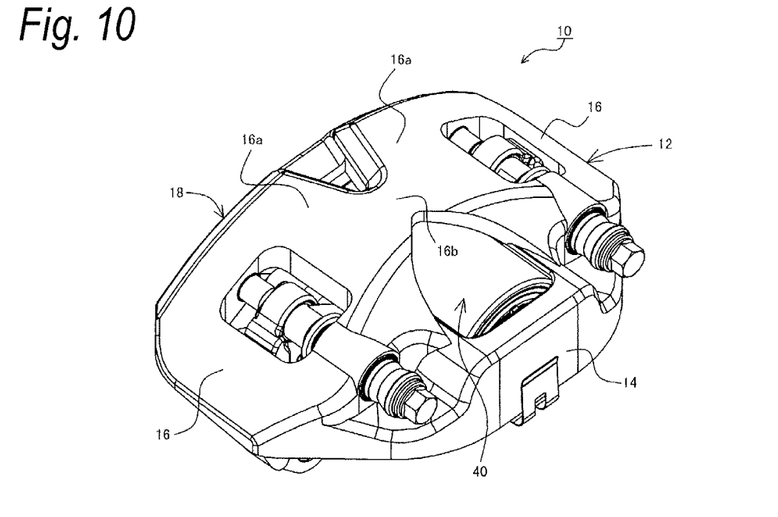
FIG. 10 is a view showing a first modification of the shape of a body according to the present embodiment.

On the other hand, when it is desired to increase the rigidity of the body 12, it is possible to make a configuration as the first modification in the form of the body 12 shown in FIG. 10 for example. Specifically, a connecting portion 16b for connecting the two main bridges 16a configuring the back portion of the body 12 is provided therebetween. As a forming position of the connecting portion 16b, in the circumferential direction of the rotor 74, the central portion between the two main bridges 16a may be used as a base point. Further, in the axial direction of the rotor 74, the central portion of the axial length of the body 12 may be used as a base point.

In a case of such a configuration, the rigidity of the body 12 can be increased compared with a form without the connecting portion 16b. In particular, when viewing the body 12 in a plan view, it is possible to obtain a high strength against a force in an oblique direction where the connecting portion 16b is used as a base point. Further, by providing the opening portion between the outer side body 18 and the connecting portion 16b, it is also possible to confirm the worn state of the brake pads (the inner pad 34, the outer pad 20) from the outer circumference side of the body 12.

[Y Type]

Figure 11:
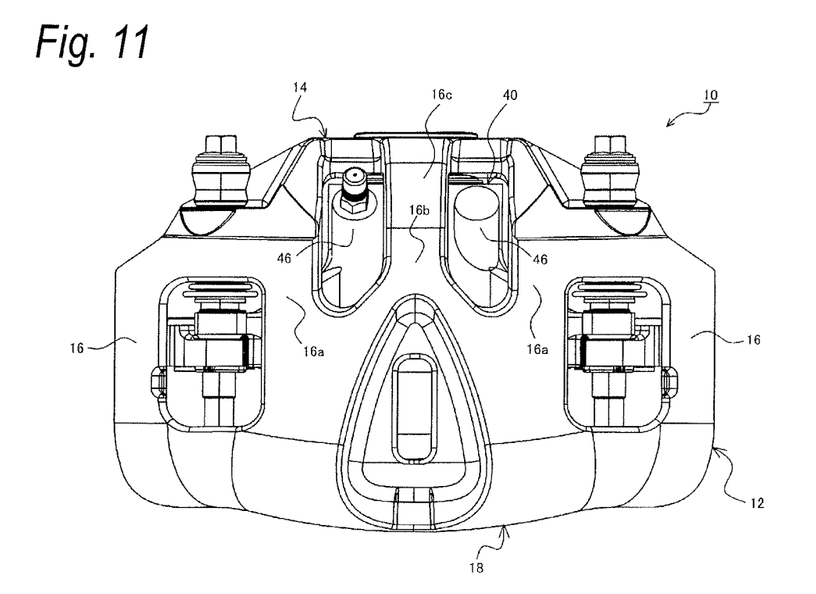
FIG. 11 is a view showing a second modification of the shape of the body according to the present embodiment.

Regarding the shape of the body 12, it is also possible to adopt a form as the second modification in the form of the body 12 shown in FIG. 11. Specifically, a center bridge 16c extending toward the inner side body 14 is provided with the connecting portion 16b in the body 12 of the form shown in FIG. 10 as a base point, and each opening portion is provided between the center bridge 16c and the main bridge 16a. Even in such a configuration, it is possible to provide an opening portion to confirm the worn state of the brake pads (the inner pad 34, the outer pad 20) between the connecting portion 16b and the outer side body 18.

Further, in such a configuration, the rigidity of the body 12 can be increased compared with a form shown in FIG. 10. Usually, when the body 12 is casted, pouring is performed from the upper side in FIG. 11, that is, the inner side body 14. In a case where the center bridge 16c is provided, the flowability can be kept good when hot water flows to the outer side body 18. Also, even after pouring, the wraparound becomes small when bubbles mixing in the hot water rise. Therefore, the deaeration property is also improved, and the concern that a cavity will be formed in the molded product after hardening is reduced.

[Cylinder Unit Modication]

Furthermore, since the opening portion between the center bridge 16c and the main bridge 16a is formed without completely covering the space between the connecting portion 16b and the inner side body 14 with the center bridge 16c, the freedom of the layout on the structure in the cylinder unit 40 can be favorably maintained. Specifically, it is possible to protrude the bleeder hole/inlet hole 46 from each of the openings disposed on the rotation-in side and the rotation-out side of the rotor 74 via the center bridge 16c. The inlet hole is a supply port for supplying the hydraulic oil to the cylinder 44 of the cylinder unit 40, and the bleeder hole is a discharge port for bleeding air from the hydraulic oil or exchanging the hydraulic oil. Further, since the opening portion formed between the center bridge 16*c* and the main bridge 16*a* is formed as a long hole whose major axis is the axial direction of the rotor 74, even in a case where the linings 36, 22 of the brake pads (the inner pad 34, the outer pad 20) wear, the bleeder hole/inlet hole 46 protruding from the cylinder block 42 does not interfere with the body 12.

Figure 12:
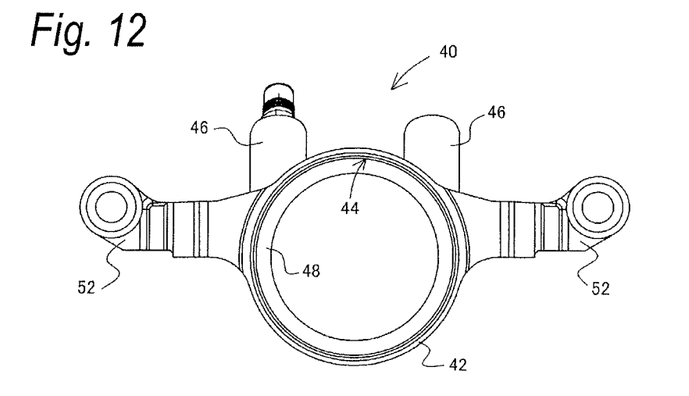
FIG. 12 is a view showing a configuration example of the cylinder unit in which opening surfaces of a bleeder hole and an inlet hole according to the present embodiment are disposed toward the inner side oblique outer circumference direction of the rotor.

As shown in FIG. 12, since the bleeder hole/inlet hole 46 is disposed on the radial outer circumference side of the rotor 74 in the cylinder block 42, the operation of bleeding air from the hydraulic oil and exchanging the hydraulic oil can be performed from the outer circumference side of the body 12. This makes it possible to improve the operability when bleeding air from the hydraulic oil and exchanging the hydraulic oil compared with the case where the bleeder hole/inlet hole 46 is disposed inside the body 12.

Figure 13:
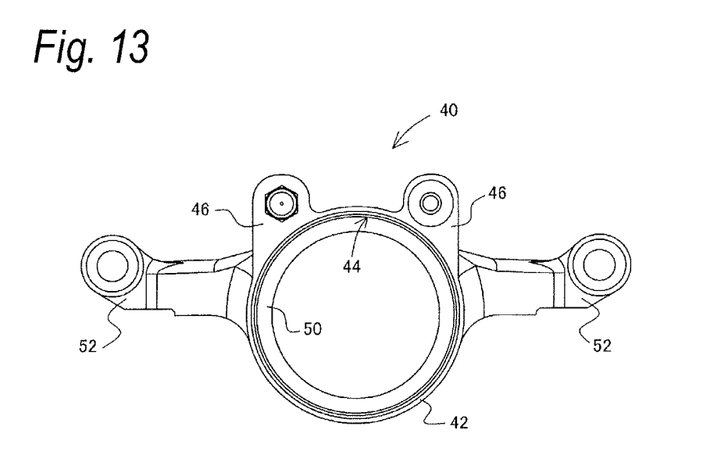
FIG. 13 is a view showing a configuration example of the cylinder unit in which the opening surfaces of a bleeder hole and an inlet hole according to the present embodiment are disposed toward the axial inner side of the rotor.
Figure 14:
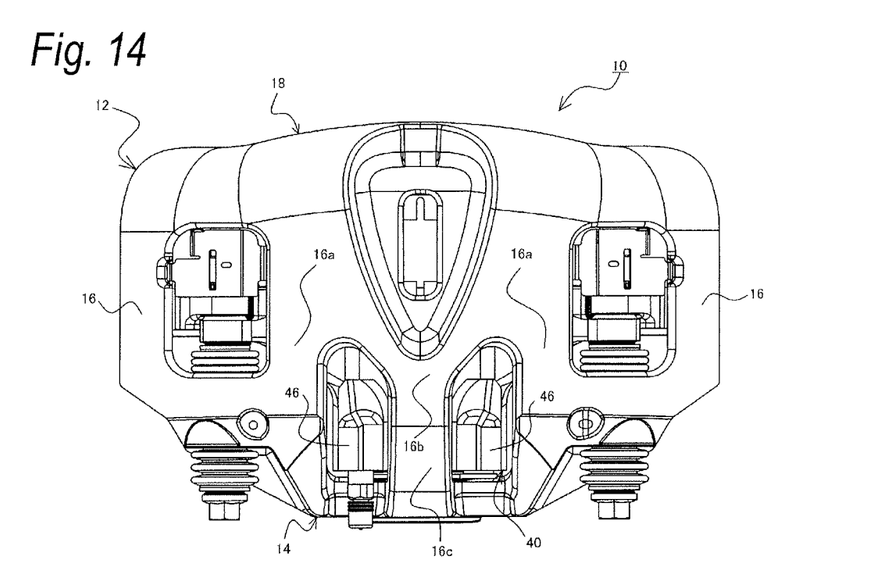
FIG. 14 is a plan view showing a state in which a body having a center bridge is assembled to the cylinder unit shown in FIG. 13.

In this way, when the bleeder hole/inlet hole 46 is disposed on the outer circumference side in the radial direction of the rotor 74 in the cylinder block 42, if it is possible to access the bleeder hole/inlet hole 46 from the opening portion formed between the center bridge 16*c* and the main bridge 16*a* of the body 12, there is no need to limit the disposition direction of the opening surface. For example, as can be read with reference to FIGS. 11 and 12, the opening surface of the bleeder hole/inlet hole 46 may be between the outer circumference side in the radial direction and the inner side in the axial direction of the rotor 74, that is, toward the outer circumference direction oblique to the inner side, as shown in FIGS. 13 and 14, it may be disposed so that the opening surface faces the inner side in the axial direction of the rotor 74. FIG. 13 is a view (back view) showing a configuration of a case where the cylinder unit 40 in which the bleeder hole/inlet hole 46 is disposed toward the inner side in the axial direction of the rotor 74 is viewed from the inner side. Further, FIG. 14 is a plan view showing an example of a case where the body 12 having the center bridge 16*c* is assembled to the cylinder unit 40 shown in FIG. 13.

Although not shown in the drawings, the bleeder hole/inlet hole 46 may have its opening surface toward the outer circumference side in the radial direction of the rotor 74. In either case, the same effect can be obtained in terms of improving operability when bleeding air from the hydraulic oil or exchanging the hydraulic oil.

In the disc brake device 10 according to the above embodiment and the embodiment shown in FIG. 10, the bleeder hole/inlet hole 46 is shown to be disposed on the inner circumference side in the radial direction of the rotor 74 in the cylinder block 42. However, naturally, for the disc brake device 10 of the above embodiments and the form shown in FIG. 10, as shown in FIG. 12 or FIG. 13, it is possible to apply one in which the bleeder hole/inlet hole 46 is arranged on the outer circumference side in the radial direction of the rotor 74 in the cylinder block 42.

Further, in the above embodiments, the operation of the first piston 48 and the second piston 50 is described to be achieved by supplying the hydraulic oil into the cylinder 44. However, the operation of the first piston 48 and the second piston 50 may be performed in a form other than hydraulic pressure. With such a configuration, it is possible to apply the disc brake device according to the present invention even in an environment where a hydraulic unit cannot be used because versatility can be improved.

Figure 15:
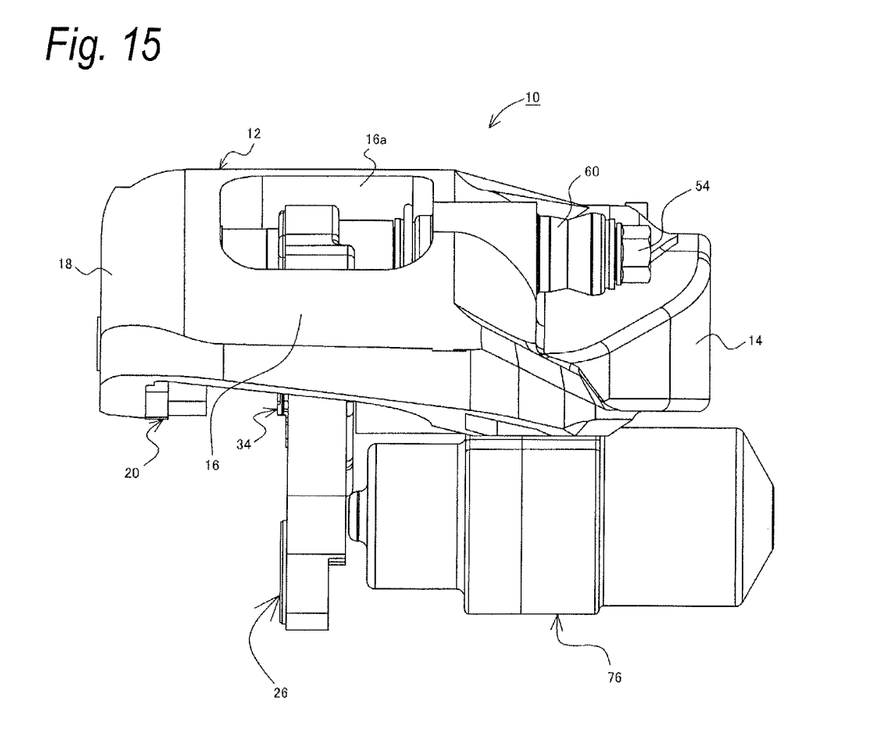
FIG. 15 is a right side view showing an example of a disc brake device including a drive mechanism of a type other than hydraulic pressure.

A specific example of an operation mode other than hydraulic pressure can include a form in which a motor gear unit 76 is used, as shown in FIG. 15. The motor gear unit 76 is accompanied with the cylinder unit 40, and power is transmitted through a gear (not shown), whereby a booster mechanism (not shown) provided in the cylinder unit 40 operates. As a result, the first piston 48 and the second piston 50 protrude to a direction in which they relatively separate from each other, and generate a pressing force.

In the disc brake device 10 according to the above embodiments, the cylinder unit 40 is fixed to the support 26 which is a fixing member. For this reason, the weight of the body 12 can be reduced compared with a case where the motor is mounted on the body which is an operating portion, and as a motor, it is possible to adopt a small and light one with small output. Therefore, it is possible to reduce the weight of the entire disc brake device.

Further, in the above embodiments, the fixation of the cylinder unit 40 to the support 26 is described as a configuration jointed with the slide pins 54 that hold the body 12. However, if the fixed positions 30*a*, 32*a* are positioned on the outer circumference side in the radial direction of the rotor 74 with respect to the torque receiving positions in the arm portions 30, 32, the cylinder unit 40 may be fixed to the support 26 by a fixing mechanism different from the slide pins 54.

Here, the characteristics of embodiments of the disc brake device according to the present invention described above are briefly summarized and listed below.

[1] A floating type disc brake device (10) in which a body (12), a support (26), and a cylinder unit (40) are configured separately, and a first piston (40) and a second piston (50) are accommodated in the cylinder unit, wherein the cylinder unit is fixed to arm portions (30, 32) provided on both the rotation-in side and the rotation-out side of a rotor (74) in the support via cylinder attachment portions (52) disposed on the outer circumference side of the cylinder unit.

[2] The disc brake device described in (1) above, wherein a fixed position for fixing the cylinder unit in the arm portion is positioned on the outer circumference side in the radial direction of the rotor with respect to a torque receiving position in the arm portion.

[3] The disc brake device described in (1) or (2) above, wherein the fixed position for fixing the cylinder unit in the arm portion is positioned on the outer circumference side in the radial direction with respect to the outer circumference of the rotor.

[4] The disc brake device described in any one of (1) to (3) above, wherein the cylinder attachment portion is fixed to the fixed position for fixing the cylinder unit via a slide pin (54) holding the body.

[5] The disc brake device described in any one of (1) to (4) above, wherein the disposing position of the cylinder unit is positioned on the inner circumference side in the radial direction with respect to the fixed position for fixing the cylinder unit, and a space is provided between the two fixed positions positioning on the rotation-in side and rotation-out side of the rotor, and main bridges (16*a*) connecting the inner side and outer side of the body are provided in the body at the rotation-in side and rotation-out side of the rotor respectively in the space provided between the fixed positions.

[6] The disc brake device described in (5) above, wherein a connecting portion for connecting the two main bridges is provided in a center part of the body back portion in an axial direction of the rotor and between the main bridge disposed on the rotation-in side and the main bridge disposed on the rotation-out side.

[7] The disc brake device described in (6) above, wherein a center bridge (16c) extending from the connecting portion to the inner side of the body is provided.

[8] The disc brake device described in any one of (1) to (7) above, wherein
the support and the cylinder unit are made of different materials.

[9] The disc brake device described in any one of (1) to (8) above, wherein
the first piston and the second piston are configured to generate pressing force by power other than hydraulic pressure.

The present invention is not limited to the above-described embodiments, and can be appropriately modified, improved and the like. In addition, materials, shapes, dimensions, numbers, disposition locations, and the like of configuration elements in the above-described embodiments are arbitrary as far as the present invention can be achieved, and are not limited.

This application is based on a Japanese patent application (Japanese Patent Application No. 2015-137810) filed on Jul. 9, 2015 and a Japanese patent application (Japanese Patent Application No. 2016-022346) filed on Feb. 9, 2016, the content of which is incorporated herein by reference.

INDUSTRIAL APPLICABILITY

According to the disc brake device of the present invention, it is possible to provide a floating type disc brake device capable of reducing the load on slide pins and eliminating the concern about insufficient strength at the time of braking.

DESCRIPTION OF REFERENCE NUMERALS 10 disc brake device
12 body
14 inner side body
14a pressure receiving portion
14b guide hole
16 side bridge
16a main bridge
16b connecting portion
16c center bridge
18 outer side body
18a pin receiving portion
20 outer pad
22 lining
24 pressure plate
26 support
28 bridge
28a fastening hole
30 arm portion
30a fixed position
30a1 through hole
32 arm portion
32a fixed position
32a1 through hole
34 inner pad
36 lining
38 pressure plate
38a ear portion
40 cylinder unit
42 cylinder block
44 cylinder
46 bleeder hole/inlet hole
48 first piston
50 second piston
52 cylinder attachment portion
54 slide pin
56 sleeve
58 boots
60 boots
62 cap nut
62a pin
64 clip
66 shim
68 shim plate body
70 clamping portion
72 claw
74 rotor

The invention claimed is:

1. A floating type disc brake device comprising:
a body,
a support including arm portions which hold an inner side brake pad slidably and which are provided on both a rotation-in side and a rotation-out side of a rotor in the support; and
a cylinder unit, wherein
the body, the support, and the cylinder unit are configured separately,
the cylinder unit includes a first piston configured to press the inner side brake pad, a second piston configured to press the body, a cylinder block accommodating the first piston and the second piston, and cylinder attachment portions extended from the cylinder block,
the cylinder unit is fixed to the arm portions via the cylinder attachment portions disposed on an outer circumference side of the cylinder unit.

2. The disc brake device described in claim 1, wherein the cylinder unit is fixed to fixed positions in the arm portions on an outer circumference side in a radial direction of the rotor with respect to torque receiving positions in the arm portions.

3. The disc brake device described in claim 2, wherein the cylinder unit is fixed to the fixed positions in the arm portions on the outer circumference side in the radial direction with respect to an outer circumference of the rotor.

4. The disc brake device described in claim 2, wherein the cylinder attachment portions are fixed to the fixed positions via slide pins holding the body.

5. The disc brake device described in claim 2, wherein the cylinder unit is positioned on an inner circumference side in the radial direction with respect to the fixed positions, and a space is provided between the two fixed positions on the rotation-in side and rotation-out side of the rotor, and
main bridges connecting the inner side and outer side of the body are provided in the body at the rotation-in side and rotation-out side of the rotor respectively in the space provided between the fixed positions.

6. The disc brake device described in claim 5, wherein a connecting portion for connecting the two main bridges is provided in a center part of the body back portion in an axial direction of the rotor and between the main bridge disposed on the rotation-in side and the main bridge disposed on the rotation-out side.

7. The disc brake device described in claim 6, wherein a center bridge extending from the connecting portion to an inner side of the body is provided.

8. The disc brake device described in claim 1, wherein the support and the cylinder unit are made of different materials.

9. The disc brake device described in claim 1, wherein the first piston and the second piston are configured to generate pressing force by power other than hydraulic pressure.

* * * * *